Figure 1:
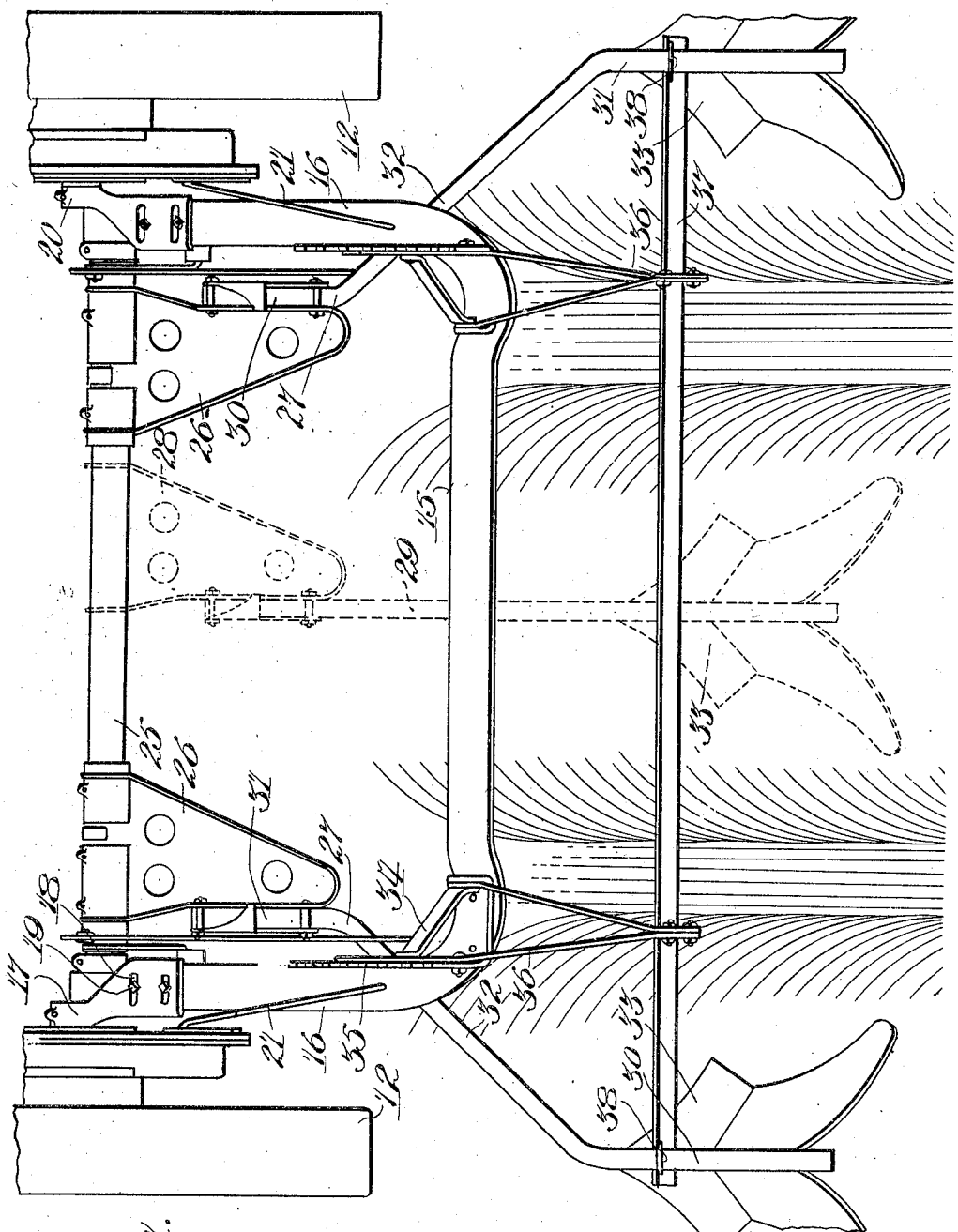

July 1, 1930.  L. J. TRIAL  1,769,085
LISTER PLOW ATTACHMENT FOR TRACTORS
Filed June 23, 1927  2 Sheets-Sheet 1

Inventor
L. J. Trial
By
Atty.

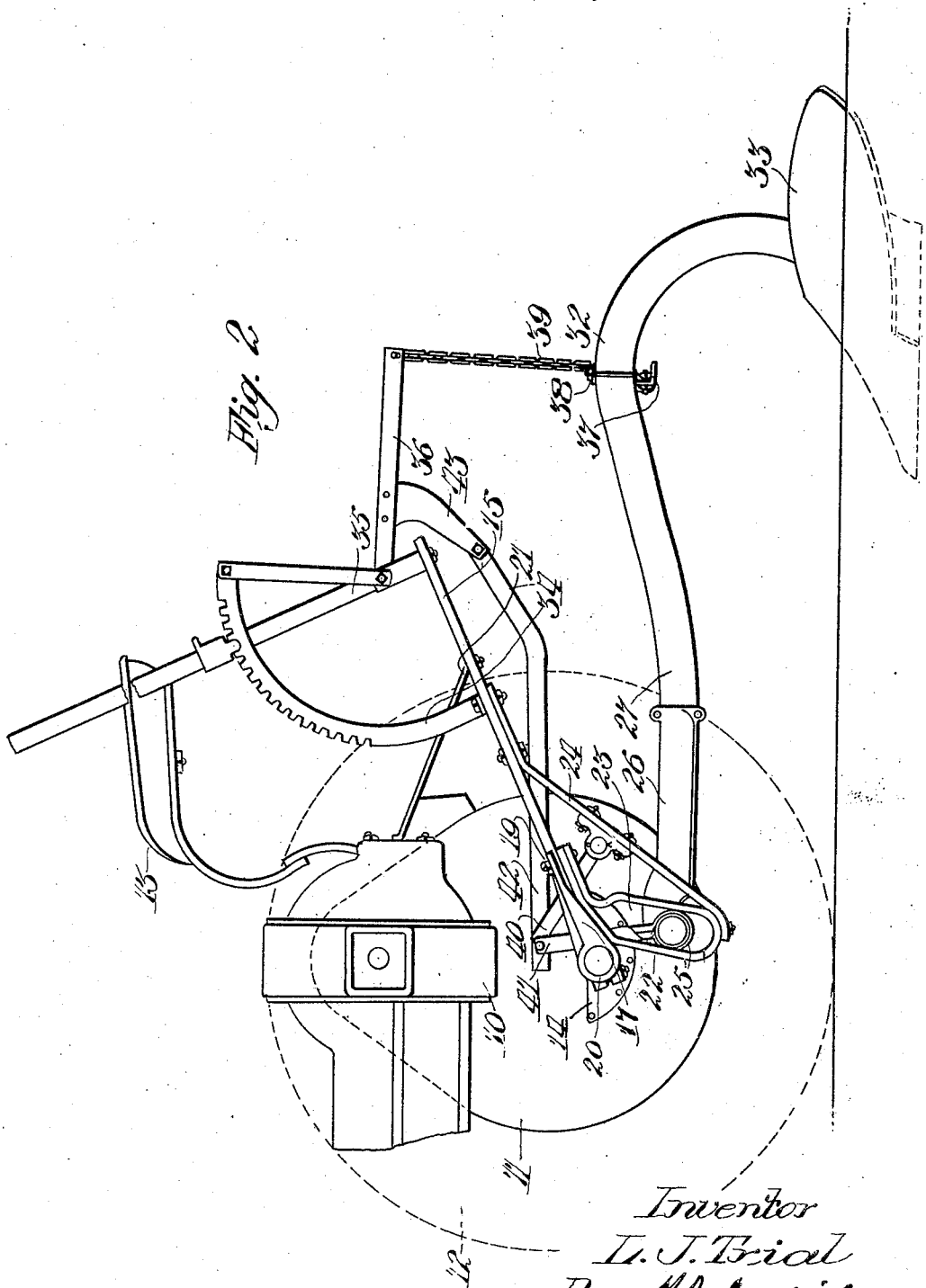

Patented July 1, 1930

1,769,085

UNITED STATES PATENT OFFICE

LOUIS J. TRIAL, OF HOBSON, TEXAS, ASSIGNOR TO INTERNATIONAL HARVESTER COMPANY, A CORPORATION OF NEW JERSEY

LISTER-PLOW ATTACHMENT FOR TRACTORS

Application filed June 23, 1927. Serial No. 200,808.

This invention relates to tractor operated tillage implements and more particularly to one adapted for lister plowing, and is an improvement on the structure disclosed in assignee's copending patent to Benjamin, 1,685,267, Sept. 25, 1928, filed August 9, 1924.

The main object of the invention is to provide a plow carrying attachment designed for use in combination with row-crop tractors having rear traction wheels spaced to span two plant rows of a cotton or corn field, said spacing being greater than usual on standard tractors. When plowing middles, such spacing allows the wheels to ride on alternate ridges of a ridged or bedded field such as is produced in the practice of lister cultivation, skipping an intermediate ridge on each traverse of the field, and it is the object of the invention to so connect and arrange the plows as to cause them to engage the ridges on which the wheels are traveling.

Another object is to provide an attachment of the type referred to in which a third plow positioned between the two that follow the wheels may be employed when it is desired to operate on three ridges at once.

A still further object is to construct the attachment with a draft frame to which the plows are connected by means including lifting and lowering mechanism, the draft frame and plows being attachable to the tractor as a unit.

The foregoing and other minor objects are attained by the construction and arrangement of parts hereinafter more specifically described and defined in the claims.

Referring to the drawings:

Figure 1 is a plan view, showing the rear end of the tractor, including the widely spaced traction wheels, and the novel plowing attachment in position thereon and showing the relation to the field ridges; and Figure 2 is a similar side view with the axle structure of the tractor in section.

The invention is herein illustrated in combination with a tractor having wide spread rear wheels carried on an upwardly arched rear axle structure having a transverse housing 10 containing the differential and the lateral shafts extending therefrom, to which transverse housing are secured depending housings 11 containing gearing driven by the differential shafts, which, in turn, drive the spindles of the traction wheels 12. The traction wheels are mounted on the outer sides of the housings 11, as clearly seen in Figure 1, and the differential housing serves as a support for a driver's seat 13. On the lower, inner portions of each of the housings 11, there are inwardly projecting, cylindrical studs or bosses 14, which support a transversely extending and rearwardly projecting U-shaped supporting frame 15. The frame 15 is preferably formed from a rigid flat metal bar having parallel arms 16 extending at right angles to the straight transverse portion of the bar. On each of the arms 16 there is a coupling bracket 17 having a widened rear portion provided with a pair of transverse slots 18 receiving fastening bolts 19, which secure the brackets to the arms. Each bracket is formed with a split bearing head 20 adapted to be mounted on the stud 14. Through provision of the slots 18, either of the brackets 17 may be shifted laterally to engage or disengage them with the bosses 14, thereby effecting connection or disconnection of the supporting or draft frame 15. Suspension links 21 connect each end of the axle structure of the frame 15 and sustain it at the desired angle or elevation. Beneath the forward end of each arm 16 of the draft frame, there is secured a depending draft bracket 22, which may be formed of a flat bar looped upon itself to provide a substantially vertical slot or guideway 23. The ends of each bracket 22 are secured together and to the arm 16 by means of the bolts 19, which also serve to secure the bearing bracket 17 to said arms. A diagonal bar 24 extends from the lower end of each draft bracket 22 to the under side of the arm 16, serving both as a brace and for another purpose to be described. The transverse draft bar 25, which is preferably cylindrical as shown, bridges the space between the ends of the arms 16 and has its ends engaged in the slots or guideways 23 in the brackets 22. The draft bar 25 has mounted on it coupling plates 26 to which are fastened the forward ends of plow beams 27, which thus trail from the draft bar 25. Even two or three such beams may be connected to the draft bar 25, and when a third beam is employed, it will be positioned directly midway between the other two and connected to the draft bar 25 by a coupling plate 23, as shown in the dotted lines on Figure 1. The third beam 29 extends straight back exactly on a median line with the tractor. Each of the outer beams are bent or otherwise formed to provide front and rear offset parallel ends 30, 31 connected by a diagonal portion 32, and the outer beams are so arranged that the diagonal portions 32 diverge and bring the rear ends 31 of the beams into parallel relation at points directly behind the two traction wheels. The rear ends of the beams carry middle breaker or shovel plows 33. On each side of the frame 15, there is mounted an arcuate rack bracket 34 on which there is pivoted a lever 35 having the usual latch mechanism co-operating with the rack, as shown. Each lever 35 has a rearwardly extending rigid lifting arm 36. A transverse spacing bar 37 extends across and connects the plow beams to which it is secured by suitable clamping means, as shown at 38. A chain, or equivalent flexible element, 39 connects each lifting arm 36 with the outer portions of the bar 37.

In order to provide for parallel lift of both ends of each plow beam, each brace bar 24 has mounted on it a swinging arm or lever 40 (Figure 2), the end of which is connected by a link 41 to one end of the draft bar 25. The end of each swinging arm 40 is also connected by a link 42 with a depending bracket 43 secured to each lifting arm 36 on the lever 35. By this arrangement, vertical swinging movement of either lifting arm 36 will communicate similar movement, through link 42, to the lever 40, causing the link 41 to raise or lower the draft bar 25 in the guideway 23 in unison with similar movement of the rear portion of the plow beam communicated to it through chain 39. The action of this lifting mechanism is to give initial parallel lift to the plow beam until the upper end of the guideway 23 is reached by bar 25, after which the rear end of the beam may be again additionally lifted. Owing to the length of bar 25 and spacing bar 37, either plow beam at the end of these bars may be raised from the ground without materially affecting the position of the other, and the several beams are also free to follow variations in the surface passed over.

It will be obvious to those familiar with lister cultivation that the novel arrangement of plows and traction wheels herein disclosed affords a structure particularly well adapted for lister plowing. When the soil is heavy and only two plows can be used, the spacing of the traction wheels and plows will be such as to work alternate ridges, the ridge which is straddled at one traverse of the field being plowed on the next or return traverse, etc. When three plows can be used, the arrangement of the attachment is such that an intermediate or third plow can be quickly added and three ridges at standard spacing operated on at each traverse.

It will be evident that there has been provided an attachment which may be readily connected to and disconnected from the rear end of a tractor as a unit, and which affords an organization particularly well adapted for lister plowing. The preferred embodiment of the invention herein described is capable of certain modifications without departure from the scope of the invention defined in the following claims.

What is claimed is:

1. The combination with a tractor having rear traction wheels, of a draft frame connected to the rear end of the tractor and projecting rearwardly therefrom, a pair of plow beams suspended beneath the draft frame at each outer side thereof, each beam being formed with outwardly offset rear portions lying in the line of tread of the traction wheels, and means for individually raising and lowering each beam.

2. An attachment for tractors having rear traction wheels spaced to span two plant rows, said attachment comprising a transversely extended U-shaped draftframe provided with means for rigid connection to the rear of a tractor to extend rearwardly therefrom, depending draft brackets fixed to the forward portion of the draft frame, a pair of plow beams extending rearwardly below the frame and having vertically shiftable connections with said brackets, said beams being formed with parallel outwardly offset rear ends adapted to lie in the vertical planes of the traction wheels, shovel plows carried by said offset ends, a spacing bar connecting the offset rear ends of the beams, a hand lever mounted on each outer end of the frame, and lifting connections between each lever and the front and rear portions of one plow beam including a suspension chain connecting each lever with the adjacent end portion of the spacing bar.

In testimony whereof I affix my signature.

LOUIS J. TRIAL.